United States Patent [19]

Vinot et al.

[11] Patent Number: 4,799,549

[45] Date of Patent: Jan. 24, 1989

[54] GEL-FORMING AQUEOUS MICROEMULSIONS FOR SOIL STABILIZATION

[75] Inventors: Bernard Vinot, Nice; Gerard Berrod, Villeurbanne; Jean-Louis Brun, Lyons, all of France

[73] Assignee: Rhone-Poulenc Specialites Chimique, Courbevoie, France

[21] Appl. No.: 828,877

[22] Filed: Feb. 13, 1986

[30] Foreign Application Priority Data

Feb. 13, 1985 [FR] France ................. 85 02034

[51] Int. Cl.$^4$ ................. B01J 13/00; C09K 17/00; F02D 3/12
[52] U.S. Cl. ................. 166/293; 106/74; 106/900; 252/8.512; 252/315.5; 252/315.6; 405/266; 405/270
[58] Field of Search ............... 252/8.511, 8.554, 315.5, 252/315.6, APS 8.511, APS 8.554, APS 315.5, APS 315.6; 166/293; 405/266, 270; 106/74, 900

[56] References Cited

U.S. PATENT DOCUMENTS

| | | | |
|---|---|---|---|
| 2,452,021 | 10/1948 | Wayne | 252/8.511 |
| 2,705,050 | 3/1955 | Davis et al. | 166/293 |
| 3,094,501 | 6/1963 | Wahl | 524/7 |
| 3,493,406 | 2/1970 | Fillet et al. | 106/287.1 X |
| 3,591,542 | 7/1971 | Bonnel et al. | 260/29.4 |
| 3,640,343 | 2/1972 | Darley | 166/292 |
| 3,749,173 | 7/1973 | Hill et al. | 166/291 |
| 3,815,681 | 6/1974 | Richardson | 166/281 |
| 4,140,183 | 2/1979 | Holm | 166/270 |
| 4,293,340 | 10/1981 | Metz | 106/74 |
| 4,301,867 | 11/1981 | Sydansk et al. | 166/292 |
| 4,325,658 | 4/1982 | Baker | 252/315.6 X |
| 4,354,875 | 10/1982 | Powers et al. | 106/74 |
| 4,515,704 | 5/1985 | Akred et al. | 252/135 |
| 4,521,136 | 6/1985 | Murphey | 405/263 |
| 4,609,487 | 9/1986 | Burkhardt et al. | 252/315.5 |

FOREIGN PATENT DOCUMENTS

0131295 8/1983 Japan ................. 252/8.554

*Primary Examiner*—Richard D. Lovering
*Attorney, Agent, or Firm*—Burns, Doane, Swecker & Mathis

[57] ABSTRACT

Stable, gel-forming aqueous microemulsions, well adopted for the reversible stabilization or plugging of soil/rock formations, e.g., subterranean well formations, are comprised of (i) an aqueous solution of a water-soluble alkali metal silicate, (ii) a gelling reagent therefor, and (iii) at least one surface active agent.

8 Claims, 2 Drawing Sheets

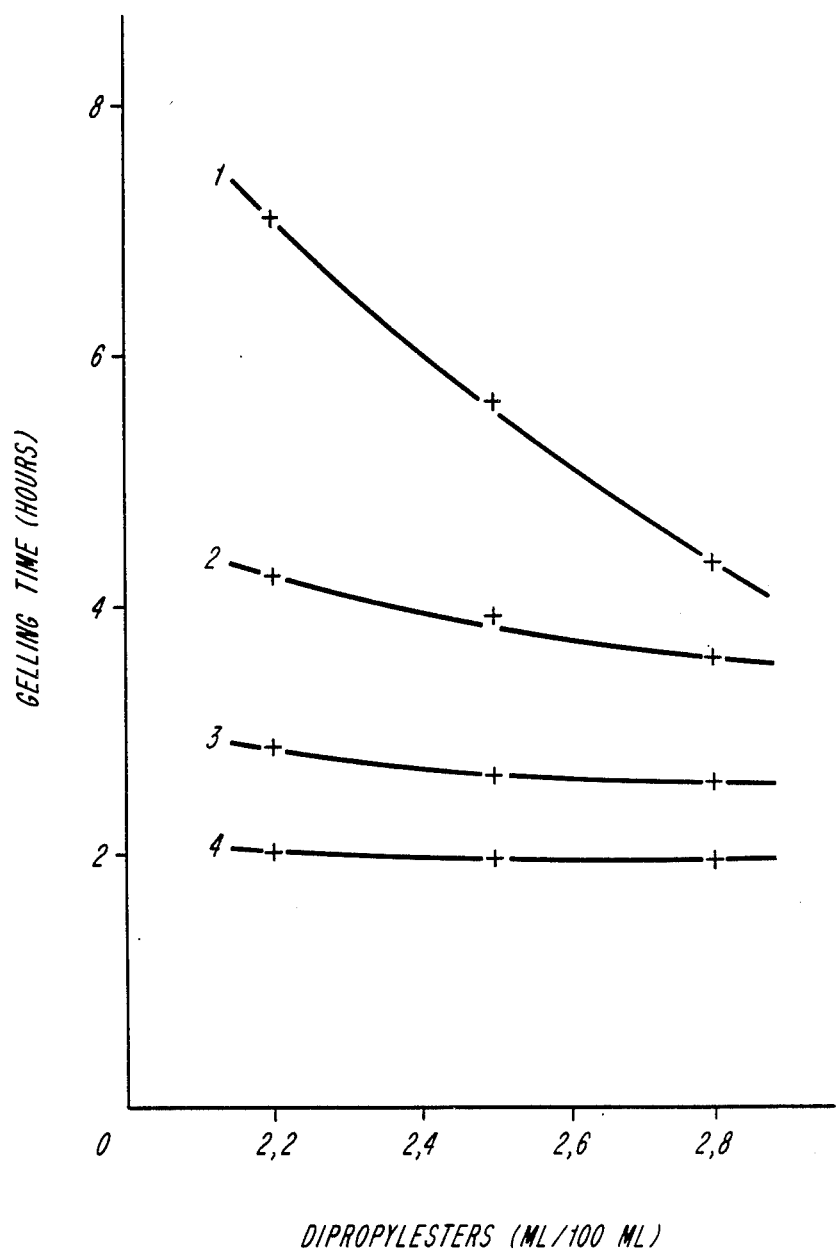

GEL-FORMING AQUEOUS MICROEMULSIONS FOR SOIL STABILIZATION

BACKGROUND OF THE INVENTION

1. Field of the Invention

The present invention relates to novel gel-forming compositions comprised of alkali metal silicates, and, more especially, to microemulsions thereof.

The present invention also relates to the use of said microemulsions for soil stabilization purposes and for the plugging of geological surface and subterranean ground formations.

2. Description of the Prior Art

It is known to this art that by addition of certain organic reagents to alkaline silicates, it is possible to obtain silica gels capable of conversion into a coherent and hard mass having the properties of a cement. Among the recommended reagents, notable are the organic esters which hydrolyze in the presence of silicates and release an acid compound to form a gel that is impermeable to water. Diacid esters particularly suitable for the sealing and consolidation of soils are described in U.S. Pat. No. 3,493,406. The selection of a particular ester or esters may depend upon the gelling time desired, in view of the intended application, and thus on the speed of hydrolysis of the esters under the temperatures likely to be encountered.

However, certain esters have the disadvantage of being poorly soluble in water, which mandates vigorous agitation prior to injection in order to provide a homogeneous mixture which gels uniformly.

The use of silicates to reduce or eliminate the permeability of subterranean formations in the treatment of oil and gas wells is also known to this art. Permanent or temporary plugging or clogging processes are used, particularly, in the drilling, reconditioning, completion and stimulation of wells and in tertiary recovery processing. Silicates have been suggested, for example, as additives to mixtures of cement or resins to seal zones characterized by high loss of circulation during drilling, or to prevent communication between several layers of the reservoir in the cementing of "casings". Silicates are also used in fracturation to obtain viscous gels having thixotropic properties. In these techniques, the silicates are employed essentially as additives and without a gel-forming reagent. In the gel form, the silicates are used in tertiary recovery operations in order to plug zones of high permeability, to prevent excessive intrusions of water into producing wells. The silicate gels heretofore employed in the petroleum industry are intended to form permanent seals. However, the injection of an alkaline silicate solution, or emulsion, into a porous medium poses certain difficulties: slow propagation, and the risk of separation which would give rise to heterogeneous clogging. If it is desired to obtain temporary and reversible clogging according to the known state of the art, organic polymers are used. These processes have the disadvantages in that they are uncertain with respect to their behavior under a variety of temperatures and the duration of the seals; furthermore, destruction of the polymer gel is often difficult to control, as is the provision of residual permeabilities less than the initial permeabilities.

SUMMARY OF THE INVENTION

Accordingly, a major object of the present invention is the provision of improved compositions suitable for the sealing and consolidation of ground formations and for the permanent or reversible plugging or clogging of subterranean formations. The subject compositions are stable, easy to use, readily propagate in porous media and are adopted to be formed into homogeneous gels, which gels are insensitive to water, oil and drilling fluids, processing parameters, and which are also resistant to the elevated temperatures potentially encountered in subterranean formations (up to approximately 200° C.) and otherwise avoid those disadvantages and drawbacks to date characterizing the state of this art.

Another object of this invention is to provide compositions useful in reversible processes for the clogging or plugging of oil bearing zones, wherein the duration of the clogging and the destruction of the gel may be perfectly controlled within a determined period of time and which make it possible to provide a residual permeability essentially equivalent to the initial permeability, after flushing with a limited volume of the agent adopted to disintegrate the gel.

Briefly, the present invention features alkaline silicate compositions in the form of microemulsions of an aqueous solution of an alkali metal silicate, a gel-forming agent and at least one surface active agent.

BRIEF DESCRIPTION OF THE DRAWINGS

FIGS. 1 and 2 are graphic representations of the variation of gelling time with the volume percent of hardener for various volume percentages of sodium silicate.

DETAILED DESCRIPTION OF THE INVENTION

Figure 1:
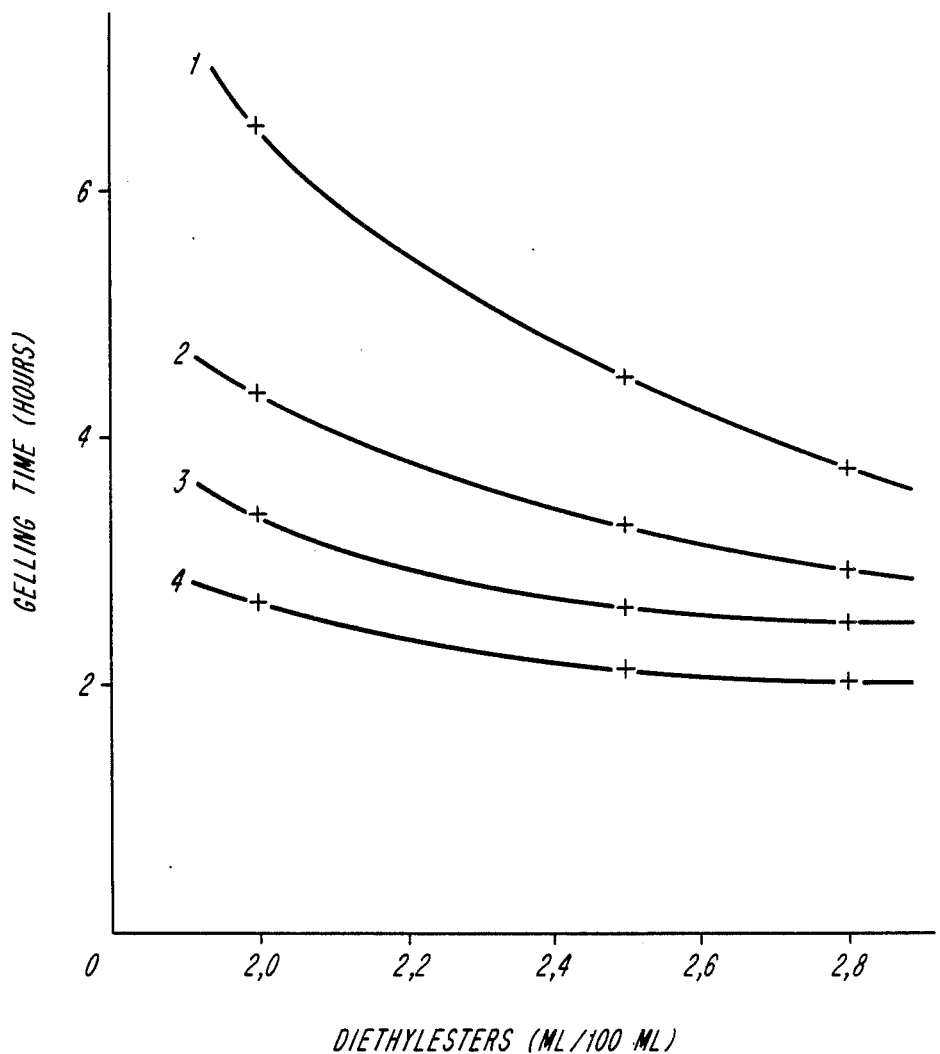

More particularly according to the present invention, microemulsions and the fundamental principles for the formation thereof are known to the art. These are thermodynamically stable systems of micelles of a liquid dispersed in a continuous liquid phase, wherein the two liquids are immiscible [MICROEMULSIONS, Theory and Practice, Edited by Leon M. Price, Academic Press (1977)].

In the microemulsions according to the invention, the aqueous phase comprises an alkaline silicate solution and the organic phase (oil) comprises the gel-forming agent.

The silicates may be silicates or polysilicates of one or more alkali metals, preferably sodium, in which the molar ratio $SiO_2M_2O$ ranges from 2 to 5 (M=alkali metal). It is permitted to use mixtures of silicates with different molar ratios and/or different alkali metals.

The concentration of silicate in the aqueous solution is determined such as to typically provide a proportion of 1.5 to 25% by weight of silica with respect to the total volume of the solution.

As regards the gel-forming agent for the silicate, any known type of compounds which are hydrolyzable under the conditions of application may be used. Exemplary compounds include the alkyl esters of aliphatic saturated or unsaturated monocarboxylic, dicarboxylic or polycarboxylic acids; alkyl esters of carbocyclic carboxylic acids; dialkyl and/or trialkyl phosphates; lactones; lower alkylamides; ketoesters. The gel-forming agent is preferably selected from among the alkyl diesters of aliphatic $C_2$–$C_{10}$ diacids, wherein the alkyl group contains from 1 to 6 carbon atoms, and mixtures thereof; alkyl diesters of phthalic acids, wherein the alkyl group contains from 1 to 6 carbon atoms, and mixtures thereof; dialkyl and/or trialkyl phosphates, wherein the alkyl group contains from 1 to 6 carbon atoms, and mixtures thereof.

Particularly preferred gel-forming agents are diesters of aliphatic $C_4$–$C_6$ diacids with a $C_1$–$C_6$ alkyl group, and specifically dimethyl, diethyl, di-n-propyl, diisopropyl, diisobutyl succinate, glutarate and adipate.

The gel-forming agent may comprise a mixture of the aforenoted acid diesters, containing the same alkyl groups, or a mixture of diesters having different alkyl groups, The diester or diesters may be used in a mixture with other gelforming reagents of known type, such as, for example, ethyl acetate, ethyleneglycol acetate, diacetin, triacetin, and the like.

The relative proportions of the gel-forming agent and the alkaline silicate may range from 25 to 100 equivalent functions of the gel-forming agent per 100 equivalent functions of alkalinity introduced by the silicate, representing a neutralization coefficient of from 0.25 to 1, preferably 0.4 to 0.8.

Within these parameters the specific formulation ($SiO_2/M_2O$ ratio, nature of the hardener, neutralization coefficient, dilution proportion) will be determined in each particular case as a function of the temperature and pressure encountered in the soil or rock formation, in a manner such as to control the hardness of the gel and to obtain a suitable setting time which may vary from approximately 15 min to 20 hr or more, at a temperature of from 20° to 200° C.

In soil consolidation it is generally desirable that setting times not be less than 10–15 min, or longer than 1 hr. If the composition is intended for the clogging of deep zones, it is desirable to select formulations having a setting time equal to or greater than approximately 3 hr.

The formation of a microemulsion requires the presence of a surface active system.

Numerous surface active systems suitable for use in the preparation of the microemulsions according to the invention may be determined by calculating the equivalent number of alkane carbons (EACN) of the gel-forming agent by using the law of Salager: Log $S = k(EACN)$, wherein $S$ is the salinity corresponding to the ionic strength of the silicate solution. The (EACN) value controls the choice of the surface active system. The hydrophobic nature of the surface active agent is decreased (or its hydrophilic nature increased) to place into microemulsion a hardener of a low (EACN). Inversely, the hydrophobic nature of the surface active agent is increased (or its hydrophilic nature decreased) to place a hardener with a high (EACN) into microemulsion. The desired consistency of the gel imparted by the silicate concentration will provide the medium with an ionic force, an additional condition which the surface active system must satisfy in keeping with Salager's law.

For example, to microemulsify a solution of a silicate and a low (EACN) hardener, an anionic surface active agent having a high HLB value will be used, such as, for example, alkylbenzene sulfonates or sulfates, alkane ethoxy sulfonates or sulfates, alkene sulfonates or sulfates, fatty alcohol sulfonates or sulfates, such as oleylsulfonate or oleylsulfate, alkyl sulfosuccinates, with all of said surfactants having a short and/or straight or slightly branched hydrocarbon chain.

If it is desired to microemulsify a solution of silicate and a high (EACN) hardener, the following are used, for example: alkane sulfonates, alkene sulfonates, fatty alcohol sulfonates, such as linoleylsulfonate, alkyl sulfosuccinates, alkylarylsulfonates, with these surfactants having a longer and more extensively branched hydrocarbon chain.

The surface active agents may be used either alone or in mixtures thereof. Even though a single surface active agent is theoretically sufficient to prepare a microemulsion, it is well known that a mixed system is more effective. It is also possible to use, together with the surface active agent or mixture of surface active agents, water soluble materials, such as short chain alcohols, for example, n-butanol, isobutanol, pentanol or hexanol. However, in view of the fact that alcohols are gelling activation agents for alkaline silicates, their use is not recommended unless long gel times are desired.

Dispersing agents, such as rosin, hydrogenated rosin, dismutated rosin and their alkaline soaps, rosin esters, may also be added to the microemulsions according to the invention.

Surface active agents that have been found to be particularly effective are the alkylsulfoesters of $C_4$–$C_{30}$ acids of the formula $R_1OOC\text{-}(CH_2)_n\text{-}CH(SO_3Na)\text{-}COOR_2$, in admixture with alkaline alkyl and/or alkenylsulfonates, and more particularly the mixture of sodium dihexylsulfosuccinate and sodium α-olefin ($C_{16}$–$C_{20}$) sulfonate.

The amount of the surface active agent, or the surface active system, is advantageously on the order of 0.3 to 15% by weight of active ingredient with respect to the weight of the microemulsion.

The silicate microemulsions according to the invention are suitable for all general applications of sealing and consolidation of soil and geological formations. They are easily handled and may be injected into particularly dense terrains, or into finely porous rock formations, due to their low initial viscosity, which is close to that of water. They retain their fluidity and clarity until the degree of ester hydrolysis becomes sufficient to initiate the setting of the gel. Viscosity then increases rapidly until a highly consistent gel is obtained.

These alkaline microemulsions are of particular interest for the temporary or permanent clogging of a subterranean formation penetrated by a well borehole in view of the absence of corrosion of the installations, good propagation in porous formations due to the low surface tension, control of the viscosity of the gel and the setting time, long life of the clogging, reversibility of the treatment, etc.

In one particular embodiment of the invention, the microemulsions are used in a temporary clogging process wherein a microemulsion of an aqueous solution of an alkali metal silicate, a gel-forming agent and at least one surface active agent is injected into the formation, the composition is allowed to gel and the gel is maintained for the duration of the clogging period desired, after which an aqueous alkaline solution is injected to disintegrate the gel.

The microemulsion may be injected into the formation by any known means. After gelling and hardening, the permeability of the formation is reduced to a value sufficiently low to seal such formation against water, oil and drilling and treating fluids, while permitting the subsequent penetration of an alkaline solution under the temperature and pressure conditions applied.

The permeability of the formation after clogging is favorably reduced to a value generally from 1 to 10 millidarcys, as a function of the specific formulation selected.

The process in which clogging by means of the silicate microemulsions according to the invention is disintegrated may be explained by the volumetric contraction of the gel in the rock. This phenomenon is typically deemed syneresis. Depending upon the formulation of the microemulsion (in particular the silicate concentration), and the temperature of the medium, synereses from 0 to 95% may be obtained, while total syneresis may be attained only after several months.

The choice of formulation thus makes it possible to provide permanent or definitive clogging systems, or systems with controlled permeability. By using microemulsions exhibiting very strong synereses, on the order of 60 to 80%, it is possible to consolidate a brittle structure, while retaining a measure of hydrocarbon or flush liquid permeability.

When unclogging becomes necessary, an alkaline solution (sodium, potassium or lithium hydroxide) is injected in a concentration of from 2 to 20%. This solution, injected under pressure, slowly penetrates into the rock formation, the residual permeability of which is not entirely zero, and dissolves the gel at the rate of its advance. The time required to disintegrate the gel depends upon the thickness of the layer treated, the initial formulation of the gel and the deposit itself. The solution obtained after the dissolution of the gel contains no solid particles or clogging precipitates, which makes it possible to restore the initial permeability of the producing zone.

In another embodiment of the invention, it may be useful, as a function of the nature of the deposit, to carry out a pre-injection of the zone to be treated utilizing an alkaline solution, for example, a sodium hydroxide solution, at a concentration of from $10^{-3}$ to 2 moles per liter. This sodium hydroxide front, in advance of the plug, makes it possible to assure the perfect dissolution of the gel during unclogging, by maintaining the treated zone at a high pH.

The process of temporary clogging may be used, in particular, during the operations of drilling, the reconditioning of wells and tertiary recovery. During drilling, mud circulation losses require rapid and effective clogging which, in the conventional manner, is carried out by means of a mixture of cements or resins. According to this invention, the aqueous composition containing the silicate and the gel-forming agent is injected into the zones of circulation loss, the silicate is allowed to gel and, following the conditioning of the well, an alkaline solution is injected through the drill pipe to disintegrate the gel. In contrast to the processes of the prior art, the process according to the invention makes it possible to completely restore the clogged zone in order to test it (oil or water zone).

The process is also applicable for the drilling of multiple producing zones. Conventionally, during the drilling of a producing zone, in order to prevent damage to the zone, a change of mud is effected, this mud being less contaminating but also less effective. The process according to the invention may be used to temporarily clog the zone, such that when drilling is continued into another producing zone, the same mud may be used. Following the disintegration of the gel, the producing zone is restored.

In a well treating application wherein it is desired to temporarily clog a deposit zone, the injection of a microemulsion according to the invention makes it possible, by virtue of the low interfacial tension properties between the microemulsion and the oil, to displace the oil located in this zone, while maintaining very good clogging.

The subject process of temporary clogging is further applicable to the reconditioning of producing wells. The reconditioning fluids used to "kill" the well generally cause much damage: reduction of the absolute permeability of the formation and its permeability relative to oil, increase in the viscosity of the fluid of the reservoir. It is thus appropriate to protect the producing zone. In the case of multiple completion, it may be necessary to isolate zones with different pressures. Temporary clogging by the process of the invention permits the effective isolation of the producing zone or zones; then, following the disintegration of the gel, permits the return of the reservoir or reservoirs to production, by restoring the initial permeability of the rock formation.

The microemulsions may also be used in processes for the recovery of oil from reservoirs by the injection of water (water flooding). In the course of this operation, differences in permeability are highly important with respect to the efficiency of recovery. The water injected in producing wells preferably travels through zones of high permeability to the detriment of zones of low permeability, while generating, more or less rapidly, a water "breakthrough" in the low permeability oil reservoir. In order to prevent this phenomenon, according to another embodiment of the invention, a silicate microemulsion is injected through an injection well in an amount sufficient to penetrate into the most permeable zones of the formation, thereby effecting selective clogging of these zones. Following the setting of the gel, an alkaline solution is injected through the injection well to disintegrate the gel until a "breakthrough" of the alkaline solution into the low permeability zone is obtained. Finally, the injection of water (water flooding) is resumed in order to force the oil toward one or more producing wells. The amount of the alkaline solution to be injected may be controlled on the surface by the drop of pressure upon the occurrence of a "breakthrough". The process has the effect of correcting the flushing profile of water and oil, with a reduction in the production of water and an increase in the production of oil. Furthermore, the front of the alkaline silicate solution, after the destruction of the gel, makes it possible to form surfactants in situ, reducing surface tensions and reducing the adsorption of surfactants, with the net result of more effective flushing and an improved recovery of oil.

In order to further illustrate the present invention and the advantages thereof, the following specific examples are given, it being understood that same are intended only as illustrative and in nowise limitative.

EXAMPLE 1

Microemulsions were prepared corresponding to the formulations reported in Table 1, in the following manner:

The two surface active agents were introduced into the water, under agitation. The silicate was added and then the hardener (ester).

The agitation was continued for a period of from 0 to 10% of the setting time until a clear solution was obtained.

In all of the experiments, the sodium silicate was an aqueous solution of 41° Baume, with a $SiO_2/Na_2O$ ratio equal to 3.22. The surface active system was a mixture of sodium dihexylsulfosuccinate in an 80% aqueous solution (Aerosol Ma 80-marketed by American Cyanamid) and a $C_{16-20}$ α-olefin sulfonate in a 30% aqueous solution ($C_{18}$ α-olefin sulfonates marketed by Ethyl Corporation).

The following are reported as the results thereof:

(a) Setting time at different temperatures: the viscosity was measured as a function of time. Setting time is defined by the point at which the speed of the increase in viscosity is infinite;

(b) The compression resistance $R_c$ of a Fontainebleau sand specimen previously injected with the microemulsion, after 5 days at 25° C. or 60° C.

As a comparison, the $R_c$ values obtained with compositions without a microemulsion but containing the same silicate and the same hardener, with a single surface active agent and without such an agent.

EXAMPLE 2

Microemulsions were prepared corresponding to the formulations reported in Table 2. The hardener used was a mixture of diethyl succinate, glutarate and adipate (Hardener 600 NDE—Rhone-Poulenc Specialites Chimiques).

All of the microemulsions were prepared in a constant ionic strength, to permit a better comparison of setting times.

As a reference, the ionic strength of the microemulsion prepared with 25% v/v silicate was used. When the amount of the silicate was reduced, sodium chloride was added to compensate for the decrease in ionic strength.

The variation in setting times measured at 25° C. as a function of hardener concentration is reflected in FIG. 1.

EXAMPLE 3

Microemulsions were prepared corresponding to the formulations reported in Table 3, using a mixture of n-dipropyl succinate, glutarate and adipate as the hardener.

The variation in setting times, measured at 60° C. as a function of the hardener concentration, is reflected in FIG. 2.

EXAMPLE 4

A microemulsion was prepared having the following composition, in % by weight/weight:

| | |
|---|---|
| (i) Sodium silicate (41° B) | 34.2% |
| (ii) Methyl phthalate | 2.9% |
| (iii) Sodium dihexylsulfosuccinate (80%) | 2.8% |
| (iv) Sodium α-olefin sulfonate (30%) | 3.7% |
| (v) Water | 56.4% |

Setting time was 3 hr at 60° C.

$R_c = 5$ bars

The $R_c$ of a control composition not in microemulsion form (no surface active agents) was less than 1 bar.

EXAMPLE 5

A microemulsion having the following composition in % weight/weight, was prepared:

| | |
|---|---|
| (i) Sodium silicate (41° B) | 27.1% |
| (ii) Hardener | 4.95% |
| (iii) Sodium dihexylsulfosuccinate (80%) | 8.35% |
| (iv) Sodium α-olefin sulfonate (30%) | 10.6% |
| (v) Water | 49% |

The hardener was a 20/20/20 mixture of isobutyl adipate, succinate and glutarate.

The setting time was 40 hr at 60° C.

EXAMPLE 6

A microemulsion was prepared having the following composition in % weight/weight:

| | |
|---|---|
| (i) Sodium silicate (41° B) | 37% |
| (ii) 600 NDE hardener | 2.75% |
| (iii) Sodium dihexylsulfosuccinate (80%) | 2.75% |
| (iv) Sodium α-olefin sulfonate (30%) | 4.85% |
| (v) Water | 52.65% |

The setting time was 1 hr, 45 min, at 60° C.

A Berea stone core sample was used (length 10.2 cm, diameter 3.9 cm), having a permeability measured in air of 610 mD, and a water permeability of 450 mD. The sample, saturated with domestic fuel oil, had a permeability of 250 mD. After desaturation with water, the water permeability was 45 mD. The core sample was again saturated with the fuel oil and then desaturated with a 4% aqueous sodium hydroxide solution (preflush).

At 25° C., 5 pore volumes (VP) of the microemulsion were injected into the core sample. The setting time of the microemulsion through the core sample was again 1 hr, 50 min, at 60° C. (no separation or absorption in the rock).

The core sample was heated to 60° C. The residual permeability for the fuel oil, measured after 16 hr, was 8 mD.

The rock formation was unclogged by means of an 8% sodium hydroxide solution, under an initial pressure of 3 bars. After injecting 5 VP over 24 hr, the fuel oil permeability was 227 mD. After desaturation with water, permeability was 36 mD. Following the washing of the core sample with an organic solvent (Baltane, acetone) and degassing in vacuum, the air permeability was 440 mD.

TABLE 1

| Ester Nature | Silicate (dry) g/l | Surfactant DHSS* g/l | Surfactant AOS* g/l | Setting time T° (°C.) | Setting time mn | $R_c$ (bars) |
|---|---|---|---|---|---|---|
| Dimethyladipate | 30.4 | 130 | 15 | 20 | 25 | 120 | 3.7 |
| Dimethyladipate | 30.4 | 130 | — | — | 25 | | <0.12 |
| Dimethyladipate | 30.4 | 130 | — | 40 | 25 | | <0.3 |
| Diethylsuccinate | 29.9 | 130 | 15 | 20 | 25 | 210 | 3.9 |
| Diethylglutarate | 28.4 | 130 | 15 | 20 | 25 | 375 | 2.2 |
| Diethylglutarate | 28.4 | 100 | 14 | 10 | 60 | 38 | 1.6 |
| Diethyladipate | 27.9 | 100 | 14 | 17 | 60 | 79 | 0.8 |
| Diethyladipate | 27.9 | 100 | — | — | 60 | | <0.3 |
| Diethyladipate | 27.9 | 100 | — | 35 | 60 | | <0.8 |
| | | | | | 70 | 55 | |

TABLE 1-continued

| Ester | | Silicate (dry) | Surfactant DHSS* | Surfactant AOS* | Setting time | | $R_c$ |
|---|---|---|---|---|---|---|---|
| Nature | g/l | g/l | g/l | g/l | T° (°C.) | mn | (bars) |
| Dipropylsuccinate | 31.8 | 100 | 16 | 27 | 60 | 275 | |
| | | | | | 70 | 170 | |
| Dipropylglutarate | 30.5 | 100 | 16 | 27 | 60 | 390 | |
| | | | | | 70 | 225 | |

*DHSS = sodium dihexylsulfosuccinate (Aerosol MA 80 - American Cyanamid Co.)
AOS = $C_{18}$ α-olefin sulfonate (Ethyl Corporation)

TABLE 2

| Number of curve | Sodium silicate* % v/v | Hardener % v/v | Surfactant 1 % v/v | Surfactant 2 % v/v | Sodium chloride % p/v | Water % v/v |
|---|---|---|---|---|---|---|
| 1 | 25 | 2.8 | 2.8 | 3.7 | 0 | 65.7 |
| | 25 | 2.5 | 2.8 | 3.7 | 0 | 66 |
| | 25 | 2.0 | 2.8 | 3.7 | 0 | 66.5 |
| 2 | 20 | 2.8 | 2.8 | 3.7 | 0.55 | 70.15 |
| | 20 | 2.5 | 2.8 | 3.7 | 0.55 | 70.45 |
| | 20 | 2.0 | 2.8 | 3.7 | 0.55 | 70.95 |
| 3 | 15 | 2.8 | 2.8 | 3.7 | 1.1 | 74.6 |
| | 15 | 2.5 | 2.8 | 3.7 | 1.1 | 74.9 |
| | 15 | 2.0 | 2.8 | 3.7 | 1.1 | 75.4 |
| 4 | 10 | 2.8 | 2.8 | 3.7 | 1.6 | 79.1 |
| | 10 | 2.5 | 2.8 | 3.7 | 1.6 | 79.4 |
| | 10 | 2.0 | 2.8 | 3.7 | 1.6 | 79.9 |

*Silicate - solution at 41° Be—$SiO_2/Na_2O$ = 3.3
Surfactant 1: sodium dihexylsulfosuccinate (Aerosol MA 80 - American Cyanamid Co.)
Surfactant 2: C 18 α-olefin sulfonate (Ethyl Corp.)

TABLE 3

| Number of curve | Sodium silicate* % v/v | Hardener % v/v | Surfactant 1 % v/v | Surfactant 2 % v/v | Sodium chloride % p/v | Water % v/v |
|---|---|---|---|---|---|---|
| 1 | 25 | 2.8 | 2.5 | 3.4 | 0 | 66.3 |
| | 25 | 2.5 | 2.5 | 3.4 | 0 | 66.6 |
| | 25 | 2.2 | 2.5 | 3.4 | 0 | 66.9 |
| 2 | 20 | 2.8 | 2.5 | 3.4 | 0.55 | 70.75 |
| | 20 | 2.5 | 2.5 | 3.4 | 0.55 | 71.05 |
| | 20 | 2.2 | 2.5 | 3.4 | 0.55 | 71.35 |
| 3 | 15 | 2.8 | 2.5 | 3.4 | 1.1 | 75.2 |
| | 15 | 2.5 | 2.5 | 3.4 | 1.1 | 75.5 |
| | 15 | 2.2 | 2.5 | 3.4 | 1.1 | 75.8 |
| 4 | 10 | 2.8 | 2.5 | 3.4 | 1.6 | 79.7 |
| | 10 | 2.5 | 2.5 | 3.4 | 1.6 | 80 |
| | 10 | 2.2 | 2.5 | 3.4 | 1.6 | 80.3 |

*Silicate = solution at 41° Be—$SiO_2/Na_2O$ = 3.3
Surfactant 1: sodium dihexylsulfosuccinate (Aerosol MA 80 - American Cyanamid Co.)
Surfactant 2: C 18 α-olefin sulfonate (Ethyl Corp.)

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A stable, gel-forming composition of matter adopted for reversible soil stabilization, comprising an aqueous microemulsions of (i) an aqueous phase comprising an aqueous solution of a water-soluble alkali metal silicate, (ii) an organic phase comprising a gelling reagent therefor, said gelling reagent comprising an alkyl ester of a saturated or unsaturated aliphatic mono-, di- or polycarboxylic acid, an alkyl ester of a carbocyclic carboxylic acid, a dialkyl and/or trialkyl phosphate, a lactone, a lower alkylamide, or a ketoester, and (iii) at least one surface active agent for preparing the microemulsion of the organic phase and the aqueous phase.

2. The composition of matter as defined by claim 1, said gelling reagent comprising an alkyl diester of a $C_2$–$C_{10}$ dicarboxylic acid, or admixture thereof, the alkyl moiety of which having from 1 to 6 carbon atoms.

3. The composition of matter as defined by claim 1, said gelling reagent comprising an alkyl diester of a phthalic acid, or admixture thereof, the alkyl moiety of which having from 1 to 6 carbon atoms.

4. The composition of matter as defined by claim 1, said at least one surface active agent comprising admixture of an alkylsulfoester of a $C_4$–$C_{30}$ carboxylic acid and an alkaline alkyl and/or alkenylsulfonate.

5. The composition of matter as defined by claim 4, said at least one surface active agent comprising admixture of sodium dihexylsulfosuccinate and sodium α-olefin sulfonate.

6. A method for the sealing/consolidation of a soil formation, comprising injecting therein the composition of matter as defined by claim 1 and permitting same to harden/hardening same.

7. The method as defined by claim 6, said soil formation comprising an oil well.

8. The method as defined by claim 6, further comprising disintegrating said hardened gel after predetermined period of time.

* * * * *